(12) United States Patent
Nagata et al.

(10) Patent No.: US 8,205,700 B2
(45) Date of Patent: Jun. 26, 2012

(54) POWER STORAGE DEVICE

(75) Inventors: Shuichi Nagata, Toyota (JP); Hajime Oyanagi, Toyota (JP); Hideomi Adachi, Kosai (JP)

(73) Assignees: Toyota Jidosha Kabushiki Kaisha, Aichi-Ken (JP); Yazaki Corporation, Tokyo (JP)

( * ) Notice: Subject to any disclaimer, the term of this patent is extended or adjusted under 35 U.S.C. 154(b) by 493 days.

(21) Appl. No.: 12/300,285

(22) PCT Filed: May 1, 2007

(86) PCT No.: PCT/JP2007/059795
§ 371 (c)(1),
(2), (4) Date: Nov. 10, 2008

(87) PCT Pub. No.: WO2007/129759
PCT Pub. Date: Nov. 15, 2007

(65) Prior Publication Data
US 2009/0178867 A1    Jul. 16, 2009

(30) Foreign Application Priority Data

May 10, 2006  (JP) ................... 2006-131461

(51) Int. Cl.
*B60R 16/04*  (2006.01)
*B60W 20/00*  (2006.01)
*B60L 1/00*  (2006.01)

(52) U.S. Cl. ................... 180/68.5; 180/65.275; 903/907

(58) Field of Classification Search ................ 180/68.1, 180/68.5, 65.21, 65.24, 65.1, 65.29, 65.31
See application file for complete search history.

(56) References Cited

U.S. PATENT DOCUMENTS

| | | | | |
|---|---|---|---|---|
| 4,397,365 | A | * | 8/1983 | Harbe et al. ............. 180/68.5 |
| 5,527,637 | A | * | 6/1996 | Nakazawa et al. ............. 429/99 |
| 7,048,321 | B2 | * | 5/2006 | Bandoh et al. ............. 296/37.8 |
| 7,079,379 | B2 | * | 7/2006 | Yamaguchi et al. ......... 361/676 |
| 7,497,284 | B2 | * | 3/2009 | Yamaguchi et al. ....... 180/65.1 |
| 2009/0087722 | A1 | * | 4/2009 | Sakabe et al. ................ 429/61 |

FOREIGN PATENT DOCUMENTS

| | | |
|---|---|---|
| JP | 09-074701 A | 3/1997 |
| JP | 2000-092623 A | 3/2000 |
| JP | 2001-071753 A | 3/2001 |
| JP | 2001-097051 A | 4/2001 |

(Continued)

OTHER PUBLICATIONS

"Prius Service Manual," Toyota Jidosha Kabushiki Kaisha, Oct. 14, 1997, pp. 3-3, 3-32, 3-33, and 18-88, Partial English Translation.
"Prius Service Manual Supplementary Version," Toyota Jidosha Kabushiki Kaisha, May 25, 2000, p. TH-125, Partial English Translation.

(Continued)

*Primary Examiner* — J. Allen Shriver, II
*Assistant Examiner* — Bridget Avery
(74) *Attorney, Agent, or Firm* — Sughrue Mion, PLLC

(57) ABSTRACT

A power storage device is mounted on a rear portion of a vehicle. The power storage device includes a high-voltage terminal and a low-voltage connector having a lower voltage than the high-voltage terminal. The high-voltage terminal is arranged on a front side in the vehicle. The low-voltage connector is arranged on a rear side in the vehicle.

18 Claims, 5 Drawing Sheets

FOREIGN PATENT DOCUMENTS

| | | |
|---|---|---|
| JP | 2001-097052 A | 4/2001 |
| JP | 2001-103706 A | 4/2001 |
| JP | 2003-045392 A | 2/2003 |
| JP | 2003-291663 A | 10/2003 |
| JP | 2004-181979 A | 7/2004 |
| JP | 2004-304923 A | 10/2004 |
| JP | 2005-247064 A | 9/2005 |
| JP | 2005-262894 A | 9/2005 |
| JP | 2006-040547 A | 2/2006 |
| JP | 2006-044537 A | 2/2006 |

OTHER PUBLICATIONS

"Hino Light-Duty Truck New Car Manual, Maintenance Manual, Engine and Chassis/Electric Wiring Diagram," Hino Motors, Ltd., Sep. 2003, pp. 1-2, 1-3, and 2-12, Partial English Translation.

"Manual of New Model Car Prius," Toyota Jidosha Kabushiki Kaisha, Sep. 1, 2003, p. 1-37, 1-42-1-44, Partial English Translation.

Japanese Office Action mailed Nov. 1, 2011 for counterpart Japanese Application No. 2006-131461.

\* cited by examiner

POWER STORAGE DEVICE

TECHNICAL FIELD

The present invention relates to a power storage device.

BACKGROUND ART

In recent years, electric vehicles using an electric motor as a drive source as well as so-called hybrid electric vehicles using a combination of an electric motor and another drive source such as an engine have been practically available. This kind of vehicle is equipped with a power storage unit for supplying energy, i.e., electricity to the electric motor. The power storage unit is formed of a capacitor or a repetitively rechargeable secondary battery such as a nickel-cadmium battery, nickel-hydrogen battery or lithium ion battery. The power storage unit is accommodated in a casing, and is mounted on the vehicle as a power storage device.

Japanese Patent Laying-Open No. 2005-247064 has disclosed a mounting structure of a power storage mechanism that has a cable located under a floor panel. In this mounting structure, the cable extends through an opening formed in the floor panel, and is attached to a battery-side terminal of a battery pack from its lower side. A shield cover is attached to the floor panel form its lower side, and covers the cable from the lower side. According to the disclosure, this mounting structure of the power storage unit does not require designing of positions and forms of units such seats in a cabin and a spare tire in a luggage room in view of a space for arranging the cable, and flexibility in design can be increased.

"Manual of New Model Car Prius" (issued on Sep. 1, 2003) has disclosed a structure of mounting a battery pack with its longitudinal direction parallel to a width direction of the vehicle. This battery pack includes a unit casing containing a battery computer. The unit casing is arranged on an end surface of the battery pack. The unit casing is faced toward a side in the vehicle. A cable supplying electricity for driving the motor protrudes from this unit casing toward the side in the vehicle for connection.

In recent years, electric and hybrid electric vehicles, and particularly the hybrid electric vehicles have been widely spreading. With increase in demand for the hybrid electric vehicles, the number of types of the hybrid vehicles has been increasing.

The battery pack disclosed in the foregoing manual of new model car Prius is arranged such that its longitudinal direction is parallel to the width direction of the vehicle. The cable connecting the battery accommodated in the battery pack and an inverter extends through the side surface of the battery pack.

Sizes of the power storage device primarily depend on a capacitance and output voltage of the power storage unit. Therefore, a longitudinal size of the power storage device may increase. For example, when the power storage device is arranged with its longitudinal direction parallel to the width direction of the vehicle as described above, the battery cable protruding sideways may be pressed against a body. Also, another problem may occur and, e.g., the power storage device cannot be arranged without difficulty. As described above, arrangement of the power storage device has been restricted, and the power storage device of which arrangement is less restricted has been required.

DISCLOSURE OF THE INVENTION

An object of the invention is to provide a power storage device that can increase flexibility in arrangement, and can suppress damages due to collision.

A power storage device according to an aspect of the invention is a power storage device mounted on a rear portion of a vehicle, and includes a high-voltage connection unit, and a low-voltage connection unit of a lower voltage than the high-voltage connection unit. The high-voltage connection unit is arranged on a front side in the vehicle. The low-voltage connection unit is arranged on a rear side in the vehicle.

In the invention, the power storage device is preferably arranged behind a rear seat.

In the invention, at least a part of the power storage device is preferably arranged in a region between rear wheels.

In the invention, the high-voltage connection unit is configured to handle the voltage of 60 V or more. The low-voltage connection unit is configured to handle the voltage lower than 60 V.

A power storage device of another aspect of the invention is a device mounted on a front portion or a middle portion of a vehicle, and includes a high-voltage connection unit, and a low-voltage connection unit of a lower voltage than the high-voltage connection unit. The high-voltage connection unit is arranged to face inward in the vehicle. The low-voltage connection unit is arranged to face outward in the vehicle.

In the invention, the high-voltage connection unit is preferably configured to handle the voltage of 60 V or more, and the low-voltage connection unit is configured to handle the voltage lower than 60 V.

In the invention, the power storage device is arranged under a front seat.

BEST MODES FOR CARRYING OUT THE INVENTION (First Embodiment)

Referring to FIGS. 1 to 7, description will now be given on a power storage device in a first embodiment of the invention.

Figure 1:
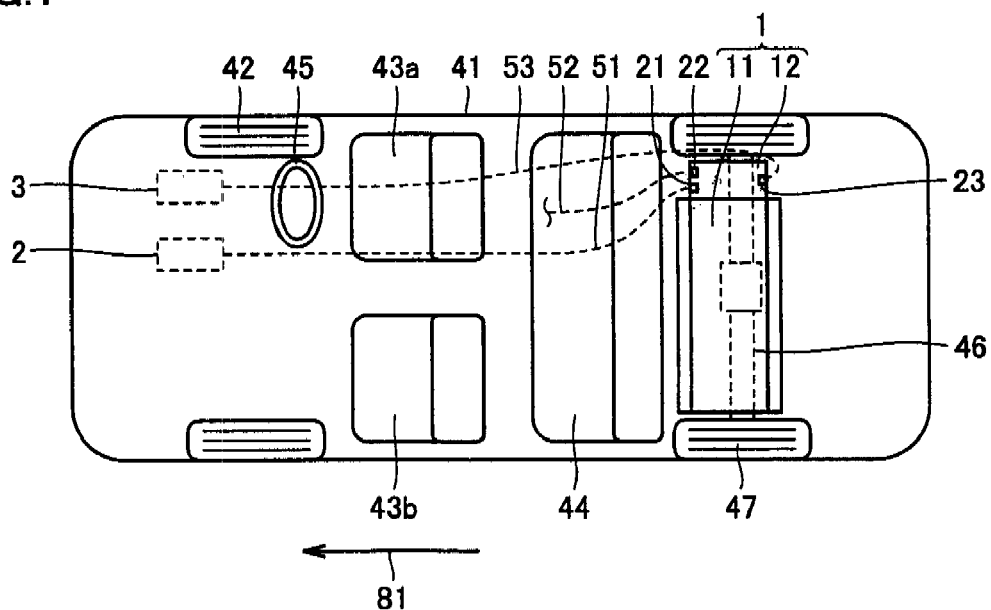
FIG. 1 is a schematic cross section of an automobile in a first embodiment of the invention.

FIG. 1 is a schematic cross section showing an arrangement of an automobile in the embodiment. An arrow 81 indicates a front side in a vehicle. The automobile in this embodiment is of a so-called sedan. The automobile in this embodiment includes a body 41, of which longitudinal direction matches a fore-and-aft direction.

The automobile in this embodiment includes front wheels 42 and rear wheels 47. The automobile in this embodiment includes front seats 43a and 43b. Front seat 43a is a driver's seat. Front seat 43b is a passenger seat. The automobile in this embodiment includes a rear seat 44. The automobile includes a steering wheel 45 arranged in front of front seat 43a.

The automobile in this embodiment includes a power storage device 1. A power storage unit that is a secondary battery, capacitor or the like is mounted on the automobile together with a casing accommodating it. In this invention, a unit including a battery casing and the power storage unit accommodated in the battery casing is referred to as the power storage device. The power storage device may include internal components other than them. The other internal components include, e.g., cooling devices such as a cooling duct and a cooling fan for cooling the power storage unit as well as an electric unit for converting an electric power.

Power storage device 1 in the embodiment includes a battery casing 11, which has a box-like form. A battery serving as the power storage unit is arranged inside battery casing 11.

Power storage device 1 is arranged in a rear portion of the vehicle. Power storage device 1 is arranged behind rear seat 44. Power storage device 1 is arranged behind the rearmost seat among those for the driver and passengers. The rear portion of the vehicle in the invention indicates the rearmost region among three portions into which the vehicle is divided substantially equally in the fore-and-aft direction. Thus, the rear portion indicates the rearmost region among the front, middle and rear portions into which the vehicle is divided. For example, the front wheels and an engine room are located in the front portion. For example, a part of a cabin is located in the middle portion. For example, a luggage room such as a trunk and rear wheels are located in the rear portion.

Power storage device 1 in the embodiment is arranged within a region between rear wheels 47. Power storage device 1 is substantially arranged immediately above a drive shaft 46 driving rear wheels 47. Drive shaft 46 extends in the width direction of the vehicle. Drive shaft 46 carries rear wheels 47 for rotation.

Power storage device 1 in the embodiment includes a connection unit box 12, which has a box-like form. Connection units are arranged inside connection unit box 12.

Figure 2:
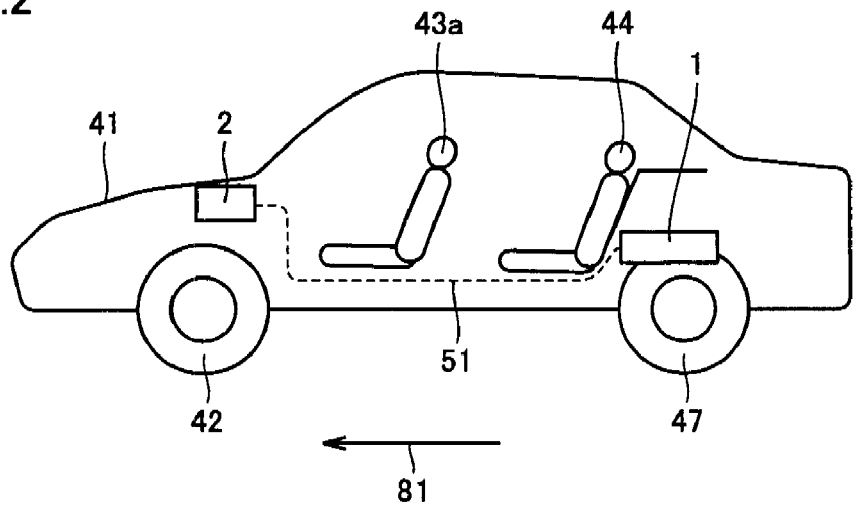
FIG. 2 is another schematic cross section of the automobile in the first embodiment of the invention.

FIG. 2 is another schematic cross section of the automobile in the embodiment. The cabin and trunk are separated from each other by a partition panel. Power storage device 1 in the embodiment is arranged in the trunk.

Figure 3:
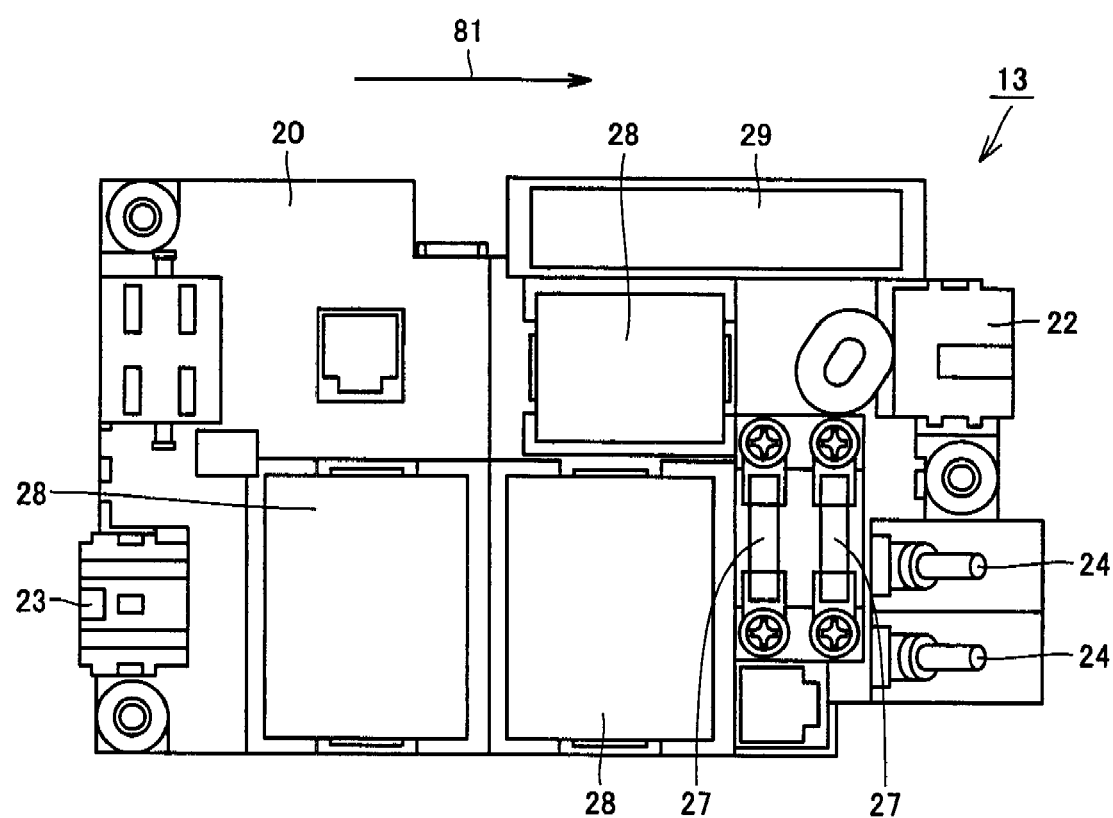
FIG. 3 is a schematic plan of a connection unit in the first embodiment of the invention.

FIG. 3 is a schematic plan of a connection unit of the power storage device in the embodiment. A connection unit 13 can externally outputs electricity supplied from the battery arranged in battery casing 11. Connection unit 13 in the embodiment includes a substrate 20, on which a relay 28, register 29 and fuse 27 are arranged.

Connection unit 13 in the embodiment includes internal terminals 24. One of internal terminals 24 is a positive terminal, and the other is a negative terminal. Internal terminals 24 are employed for supplying the electricity of a high voltage of 288 V. Internal terminals 24 are spaced from each other.

Connection unit 13 in the embodiment includes a high-voltage connector 22 serving as a high-voltage connection unit. High-voltage connector 22 can externally supply the electricity of 288 V. High-voltage connector 22 is employed, e.g., for supplying the electricity used for driving an electric power steering system.

Connection unit 13 in this embodiment includes a low-voltage connector 23 serving as a low-voltage connection unit. Low-voltage connector 23 can supply electricity of 12 V. Low-voltage connector 23 in this embodiment is configured such that a signal line for controlling a HV (Hybrid Vehicle) system can be connected thereto.

Figure 4:
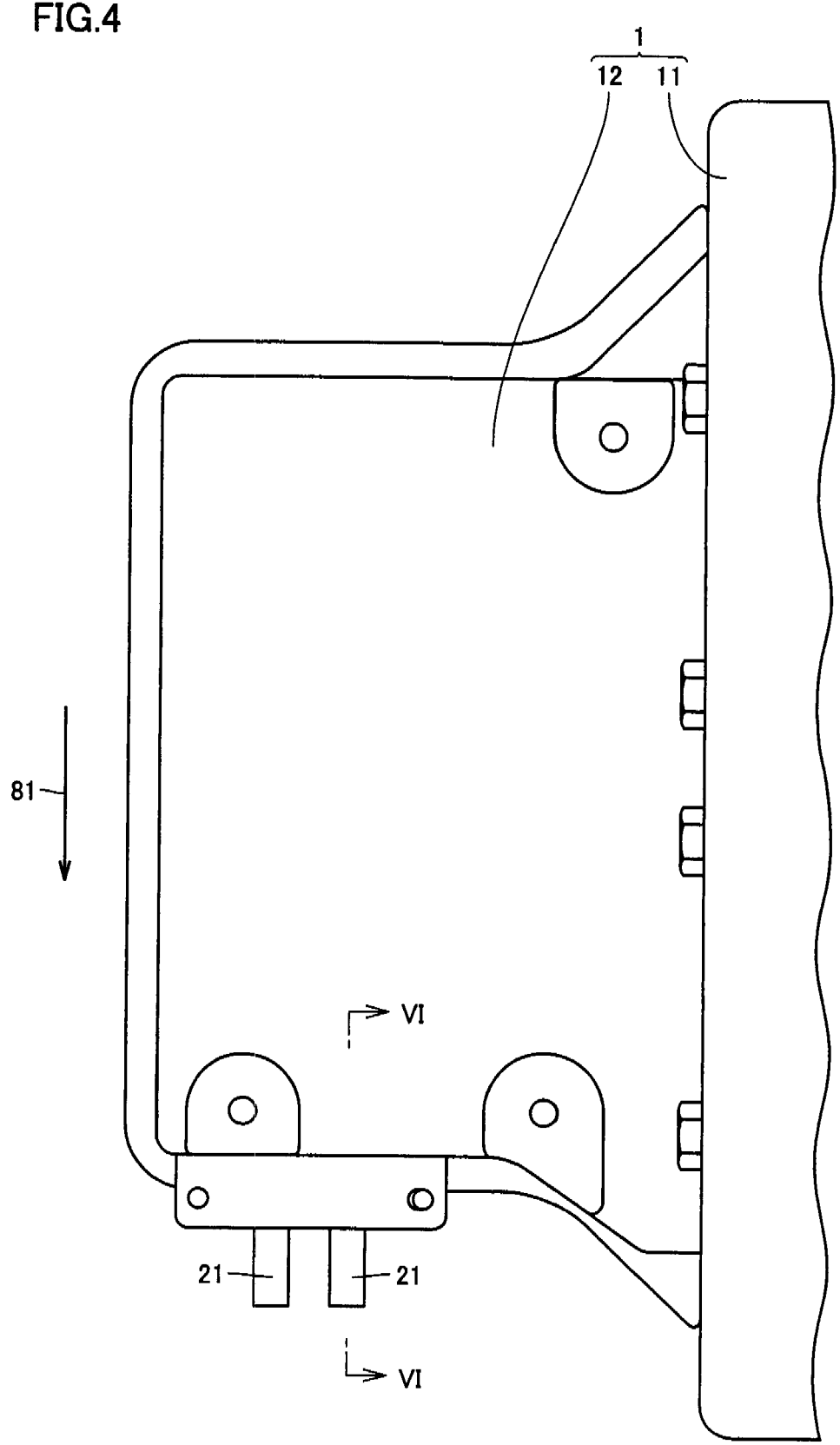
FIG. 4 is a schematically plan showing, on an enlarged scale, a connection unit box of a power storage device in the first embodiment of the invention.

FIG. 4 is a schematic plan showing, on an enlarged scale, a portion of the connection unit box of the power storage device in the embodiment. Connection unit box 12 of power storage device 1 is fixed to a side surface of battery casing 11. Connection unit box 12 in the embodiment is fixed to an end surface of battery casing 11 and more specifically to the end surface substantially perpendicular to the width direction of the vehicle.

Figure 5:
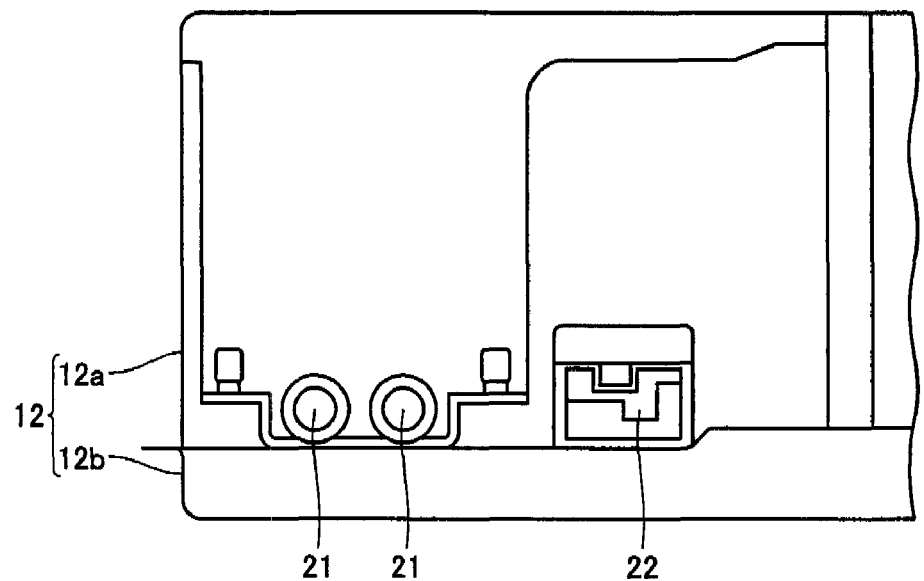
FIG. 5 is a side view of the connection unit box of the power storage device in the first embodiment of the invention.

FIG. 5 is a schematic side view of the connection unit box in the embodiment viewed from the front side in the vehicle. Connection unit box 12 in this embodiment includes upper and lower casings 12a and 12b, which are fixed together. High-voltage terminals 21 serving as high-voltage connection units are arranged on an end surface of connection unit box 12 and more specifically on the surface located on the front side in the vehicle. High-voltage connector 22 is spaced sideways from high-voltage terminals 21.

Figure 6:
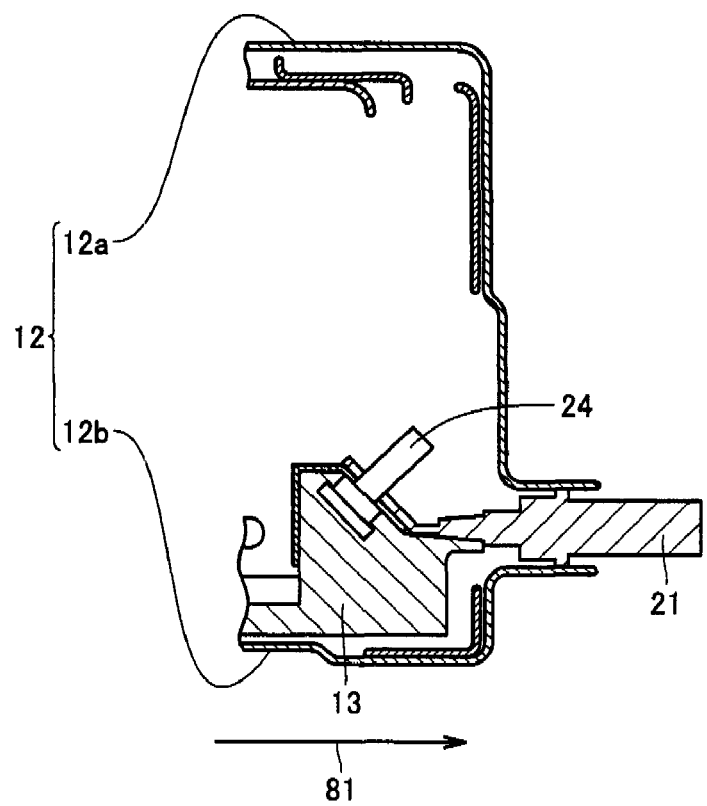
FIG. 6 is a schematic cross section of the connection unit box of the power storage device in the first embodiment of the invention.

FIG. 6 is a schematically cross section of a portion of the high-voltage terminal in the embodiment. An internal terminal 24 arranged on connection unit 13 is electrically connected to high-voltage terminal 21. High-voltage terminal 21 protrudes toward the front side in the vehicle. High-voltage terminal 21 is arranged on the side surface located on the front side in the vehicle.

Figure 7:
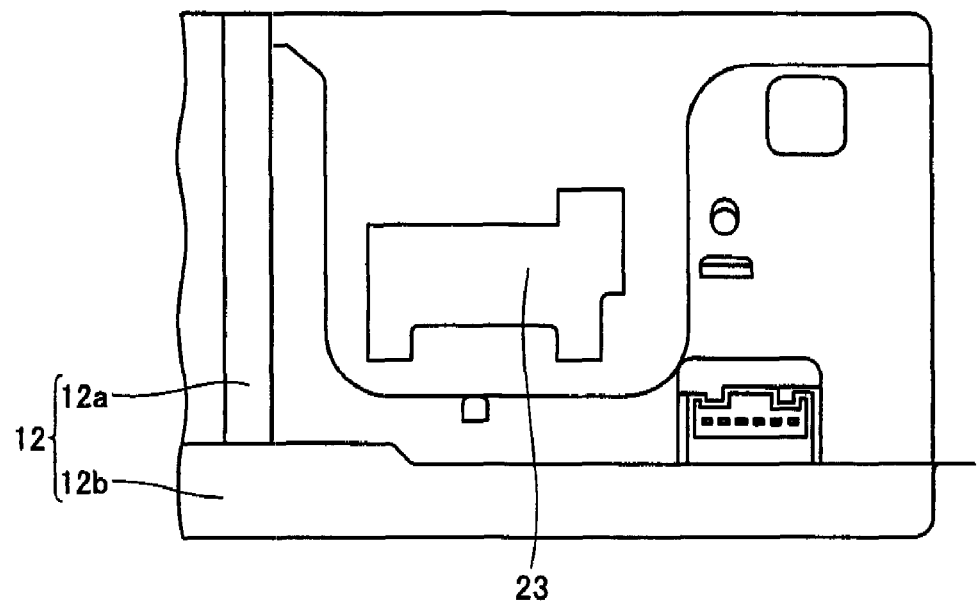
FIG. 7 is another side view of the connection unit box of the power storage device in the first embodiment of the invention.

FIG. 7 is a schematic side view of the connection unit box in the embodiment viewed from the rear side in the vehicle. Low-voltage connector 23 is arranged on a side surface of connection unit box 12 and more specifically on the surface located on the rear side in the vehicle. Low-voltage connector 23 faces rearward in the vehicle.

Referring to FIG. 1, high-voltage terminal 21 of power storage device 1 in the embodiment is connected via a cable 51 to an inverter 2 for converting DC electricity into AC electricity. Inverter 2 is arranged in an engine room. High-voltage connector 22 is connected via a cable 52 to an inverter employed for driving the electric power steering system (not shown). Low-voltage connector 23 is connected to a control unit 3 via a cable 53.

The power storage device in the embodiment includes the high- and low-voltage connection units. The high-voltage connection unit is arranged on the relatively front side in the vehicle, and the low-voltage connection unit is arranged on the relatively rear side in the vehicle.

Power storage device 1 in the embodiment is arranged such that the longitudinal direction thereof is substantially parallel to the width direction of the vehicle. Right and left rear wheels 47 restrict the longitudinal size of power storage device 1, but this restricted length can be increased. More specifically, since power storage device 1 is not provided with an electrical connection unit on its end surface substantially perpendicular to the width direction of the vehicle, the longitudinal size of power storage device 1 can be increased. Alternatively, it becomes possible to arrange the power storage device in the trunk or the like in contrast to a power storage device that cannot be arranged in the trunk because a cable protrudes from its end surface substantially perpendicular to the width direction of the vehicle. As described above, the embodiment can increase the flexibility in arrangement of the power storage device.

The high- and low-voltage connection units in the embodiment are arranged on one and the other of the end surfaces of the connection unit box, respectively. Therefore, it is possible reduce an influence by noises between the connection units or between the cables connected to the respective connection units. For example, when the high- and low-voltage connection units are arranged on the same end surface, the cables connected to the respective connection units are spaced from each other only by a short distance, and therefore noises are liable to affect such cables. Alternatively, the cables connected thereto are arranged substantially parallel to each other, and therefore noises are liable to affect such cables.

According to the power storage device in the embodiment, however, it is possible to increase a distance between the cables that are connected to the high- and low-voltage connection units, respectively. Also, the arrangement in which the cables are parallel to each other can be easily avoided. Consequently, the influence by noises can be easily reduced.

In the embodiment, the high-voltage connection unit is a connection unit that can supply a voltage of 288 V, and the low-voltage connection unit is a connection unit that can supply a voltage of 12 V. This form is not restrictive, and it is merely required that the low-voltage connection unit supplies a lower voltage than the high-voltage connection unit.

A voltage of a boundary between the high- and low-voltage connection units is, e.g., 60 V. In this embodiment, the high-voltage connection unit is configured to supply a voltage equal to or higher than 60 V, and the low-voltage connection unit is configured to supply a voltage lower than 60 V.

Referring to FIG. 1, when the vehicle is hit broadside by another vehicle, deformation of the vehicle is suppressed in the region between the rear wheels because drive shaft 46 extending in the width direction of the vehicle is arranged in this region. More specifically, drive shaft 46 exerts a reaction force against this impact in the width direction of the vehicle so that the deformation in this region is suppressed more effectively than other regions. Since at least a part of power storage device 1 is arranged in the region between the rear wheels, it is possible to suppress the damages of the power storage device that may be caused by the collision in the width direction of the vehicle.

According to the power storage device in this embodiment, the connection unit box is arranged outside the battery casing. However, this form is not restrictive, and the battery and the connection unit may be arranged in the same casing.

In this embodiment, the connection units for outputting the electricity have been described, by way of example, as the high- and low-voltage connection units, respectively. However, this form is not restrictive, and the invention can be applied to the power storage device that has connection units for electrically charging the power storage device or connection units capable of inputting and outputting the electricity for charging and discharging.

(Second Embodiment)

Figure 8:
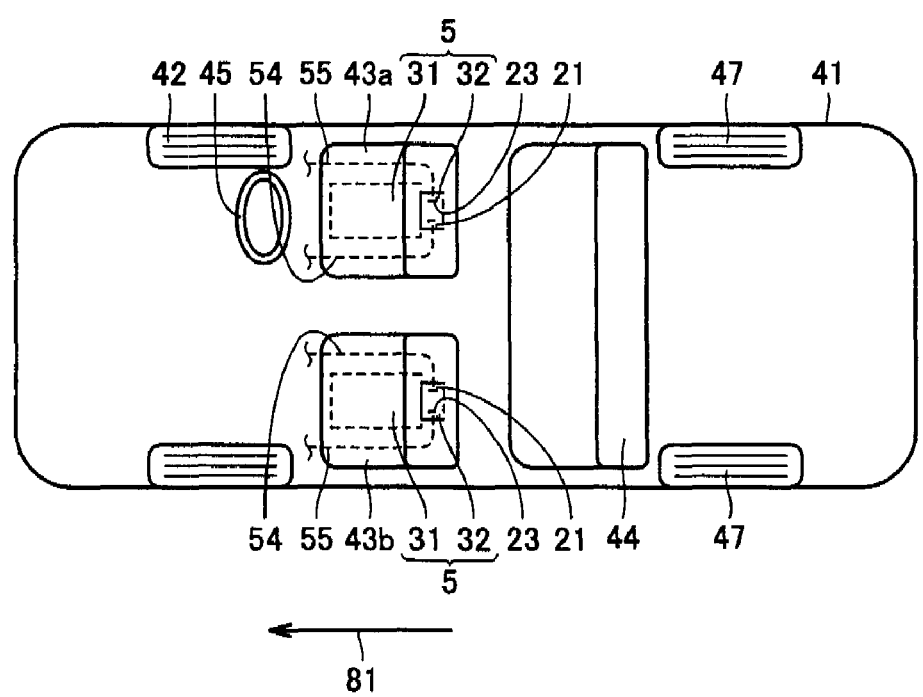
FIG. 8 is a schematic cross section of an automobile in a second embodiment of the invention.

Referring to FIG. 8, a power storage device in a second embodiment according to the invention will be described below.

FIG. 8 is a schematic cross section showing arrangement of units of an automobile in the embodiment. Arrow 81 indicates a forward direction of the vehicle. The automobile includes body 41, front seats 43a and 43b, and rear seat 44, similarly to the first embodiment.

The automobile in this embodiment includes a power storage device 5. Power storage device 5 is arranged under each of front seats 43a and 43b. Power storage device 5 in this embodiment is arranged in a middle portion selected from among the front, middle and rear portions of the vehicle. Power storage device 5 arranged in the cabin.

Power storage device 5 includes a battery casing 31 and a connection unit box 32. Power storage device 5 has a longitudinal direction. Power storage device 5 in the embodiment is arranged such that its longitudinal direction is substantially parallel to the fore-and-aft direction of the vehicle. Power storage device 5 is arranged with connection unit box 32 located on the rear side in the vehicle.

Power storage device 5 in the embodiment includes high- and low-voltage terminals 21 and 23 serving as the high- and low-voltage connection units, respectively. High-voltage terminal 21 is connected to a cable 54. Low-voltage connector 23 is connected to a cable 55.

As described above, high-voltage terminal 21 faces inward in the vehicle. Low-voltage connector 23 faces outward in the vehicle. High-voltage terminal 21 is arranged on a surface of power storage device 5 and particularly on a side surface located on the inner side in the vehicle. Low-voltage connector 23 is arranged on a surface of power storage device 5 and particularly on a side surface on the outer side in the vehicle.

In the power storage device in the embodiment, the high-voltage connection unit is remote from the body, and the damages to the high-voltage connection unit can be suppressed when an impact is applied sideways. Further, the fact that the power storage device is arranged in an outer peripheral portion of the vehicle makes the foregoing effect more remarkable.

In this embodiment, the power storage device is arranged in the middle portion selected from between the front and middle portions of the vehicle. However, this form is not restrictive, and the invention can be applied to the power storage device arranged in the front portion of the vehicle. For example, the invention can be applied to the case where the power storage device is arranged inside an engine room.

Other structures, operations and effect are the same as those of the first embodiment, and therefore description thereof is not repeated.

The invention can provide the power storage device that can be arranged with higher flexibility and can suppress the damages due to collision or the like.

In the foregoing figures, the same or corresponding portions bear the same reference numbers.

Although the present invention has been described and illustrated in detail, it is clearly understood that the same is by way of illustration and example only and is not to be taken by way of limitation, the scope of the present invention being interpreted by the terms of the appended claims.

Industrial Applicability

The invention can be effectively applied to the power storage device.

The invention claimed is:

1. A power storage device mounted on a rear portion of a vehicle, and comprising:
    a power storage device;
    a connection unit arranged on a side portion with respect to a longitudinal direction of said power storage device;
    a high-voltage connection unit; and
    a low-voltage connection unit of a lower voltage than said high-voltage connection unit, wherein
    said high-voltage connection unit is arranged on a side surface of said connection unit located on a front side in said vehicle, and
    said low-voltage connection unit is arranged on a side surface of said connection unit located on a rear side in said vehicle.

2. The power storage device according to claim 1, wherein said power storage device is arranged behind a rear seat.

3. The power storage device according to claim 1, wherein at least a part of the power storage device is arranged in a region between rear wheels.

4. The power storage device according to claim 1, wherein said high-voltage connection unit is configured to handle the voltage of 60 V or more, and
    said low-voltage connection unit is configured to handle the voltage lower than 60 V.

5. The power storage device according to claim 1, wherein a control unit controlling driving of a hybrid system having a combination of an electric motor and a drive source is connected to said low-voltage connection unit, and a signal line controlling the hybrid system is connected to said low-voltage connection unit.

6. The power storage device according to claim 1, wherein the side surface of said connection unit located on the front side in said vehicle is a side surface of said connection unit that faces the front of the vehicle.

7. The power storage device according to claim 1, wherein the side surface of said connection unit located on the rear side in said vehicle is a side surface of said connection unit that faces the rear of the vehicle.

8. The power storage device according to claim 1, wherein the high-voltage connection unit and the low-voltage connection unit are arranged on opposite sides of the connection unit.

9. The power storage device according to claim 1, wherein the connection unit is arranged on the power storage device.

10. The power storage device according to claim 1, wherein the connection unit is arranged on a casing of the power storage device.

11. A power storage device mounted on a front portion or a middle portion of a vehicle, and comprising:
    a power storage device;
    a connection unit, located adjacent to and behind said power storage device in said vehicle in a front-rear direction of said vehicle, for outputting to an external destination electric power supplied from said power storage device;
    a high-voltage connection unit; and
    a low-voltage connection unit of a lower voltage than said high-voltage connection unit, wherein
    said high-voltage connection unit is arranged on a side surface of said connection unit located on an inner side in said vehicle, and
    said low-voltage connection unit is arranged on a side surface of said connection unit located on an outer side in said vehicle.

12. The power storage device according to claim 11, wherein
    said high-voltage connection unit is configured to handle the voltage of 60 V or more, and
    said low-voltage connection unit is configured to handle the voltage lower than 60 V.

13. The power storage device according to claim 11, wherein
    said power storage device is arranged under a front seat.

14. The power storage device according to claim 11, wherein the side surface of said connection unit located on the inner side in said vehicle is a side surface of said connection unit that faces the inside of the vehicle.

15. The power storage device according to claim 11, wherein the side surface of said connection unit located on the outer side in said vehicle is a side surface of said connection unit that faces the outside of the vehicle.

16. The power storage device according to claim 11, wherein the high-voltage connection unit and the low-voltage connection unit are arranged on opposite sides of the connection unit.

17. The power storage device according to claim 11, wherein the connection unit is arranged on the power storage device.

18. The power storage device according to claim 11, wherein the connection unit is arranged on a casing of the power storage device.

* * * * *